(12) United States Patent
Hartmann et al.

(10) Patent No.: US 9,898,311 B1
(45) Date of Patent: Feb. 20, 2018

(54) SOFTWARE INSTALLATION THROUGH BOOTLOADER MANAGEMENT

(71) Applicant: AMPLIFY EDUCATION HOLDING, INC., New York, NY (US)

(72) Inventors: Joshua Hartmann, Brooklyn, NY (US); Christopher Scott Rooney, Brooklyn, NY (US); Nilesh Shah, Monmouth Junction, NJ (US); Praful J. Todkar, San Francisco, CA (US); Steven David Turner, Richmond Hill (CA)

(73) Assignee: AMPLIFY EDUCATION HOLDING, INC., New York, NY (US)

( * ) Notice: Subject to any disclaimer, the term of this patent is extended or adjusted under 35 U.S.C. 154(b) by 515 days.

(21) Appl. No.: 14/586,275

(22) Filed: Dec. 30, 2014

Related U.S. Application Data

(60) Provisional application No. 61/921,801, filed on Dec. 30, 2013.

(51) Int. Cl.
*G06F 1/00* (2006.01)
*G06F 1/24* (2006.01)
*G06F 9/445* (2018.01)
*G09B 5/00* (2006.01)
*G06F 21/57* (2013.01)

(52) U.S. Cl.
CPC .......... *G06F 9/44505* (2013.01); *G06F 8/61* (2013.01); *G06F 21/572* (2013.01); *G09B 5/00* (2013.01); *G06F 2221/033* (2013.01)

(58) Field of Classification Search
CPC ...... G06F 9/44505; G06F 8/61; G06F 21/572; G06F 2221/033; G06F 9/44; G06F 8/65; G09B 5/00
See application file for complete search history.

(56) References Cited

U.S. PATENT DOCUMENTS 9,552,479 B2 * 1/2017 Yu ........................... G06F 21/56
2011/0099547 A1 * 4/2011 Banga ....................... G06F 8/61
717/176

\* cited by examiner

*Primary Examiner* — Phil Nguyen
(74) *Attorney, Agent, or Firm* — Leason Ellis LLP

(57) ABSTRACT

A bootloader detects that an operating system of a computing device has finished booting. In response to detecting with the bootloader that the operating system of the computing device has finished booting, installation of software on the computing device except for particular educational software is disabled. The particular educational software is determined not to be installed on the computing device. In response to determining that educational software is not installed on the computing device, the particular educational software is installed. After installing the particular educational software, a boot sequence of the computing device is modified so that the particular educational software is executed after the operating system has finished booting. The bootloader is disabled.

12 Claims, 3 Drawing Sheets

SOFTWARE INSTALLATION THROUGH BOOTLOADER MANAGEMENT

CROSS-REFERENCE TO RELATED APPLICATION

This application claims the benefit of U.S. Provisional Application Ser. No. 61/921,801, filed on Dec. 30, 2013, which is incorporated by reference

TECHNICAL FIELD

This specification relates to managing a computing device.

BACKGROUND

In certain circumstances, computing devices may need to be managed.

SUMMARY

In some aspects, the subject matter described in this specification may be embodied in methods that may include the actions of detecting with a bootloader that an operating system of a computing device has finished booting. Additional actions include, in response to detecting with the bootloader that the operating system of the computing device has finished booting, disabling installation of software on the computing device except for particular educational software and determining that the particular educational software is not installed on the computing device. Further actions include in response to determining that educational software is not installed on the computing device; installing the particular educational software. Additional actions include after installing the particular educational software, modifying a boot sequence of the computing device so that the particular educational software is executed after the operating system has finished booting and disabling the bootloader.

Other implementations include corresponding systems, apparatus, and computer programs, configured to perform the actions of the methods, encoded on computer storage devices.

These and other implementations may each optionally include one or more of the following features. For instance, in some implementations, disabling installation of software on the computing device except for particular educational software includes obtaining a whitelist of educational software that is permitted to be installed and enabling the educational software on the whitelist to be installed. In certain aspects, the bootloader is installed in a protected system folder of the computing device. In some aspects, disabling installation of software on the computing device except for particular educational software includes disabling universal serial bus (USB) debugging for the computing device, the installation of software from unknown sources, clearing of settings, and quick tools that may be supported by the operating system. In some implementations, installing the particular educational software includes determining the presence of memory that is accessible by the computing device that stores installation data for the particular educational software and installing the particular educational software from the memory that is accessible. In certain aspects, disabling the bootloader includes modifying the boot sequence of the computing device so that the bootloader is not loaded.

The details of one or more implementation are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

A computing device may be used for educational purposes. For example, a school may distribute tablet computers to all students and teachers where the tablet computers are loaded with educational software. Educational software may include software that is designed to help students learn and software that is designed to help teachers to teach students. For example, educational software may include software that displays lessons to students and software that allow teachers to share lessons with students.

To prevent misuse of the computing devices, the educational software may also limit capabilities of the tablet computer and provide an administration interface for managing teacher and student computing devices. For example, the computing device may prevent students from installing social media platform applications. However, in certain cases educational software may be removed or disabled from a computing device. For example, computing devices may be factory reset. A factory reset of a computing device may return a computing device to the same state as when the computing device was provided by the manufacturer of the computing device. Accordingly, if the educational software was not installed when the computing device was provided by the manufacturer, the factory reset may cause the educational software to be deleted and allow users to use the tablet computers freely for their own purposes. Accordingly, a system for managing computing devices may be designed to manage the computing devices so that the computing devices are used with the educational software, even after a factory reset.

Figure 1:
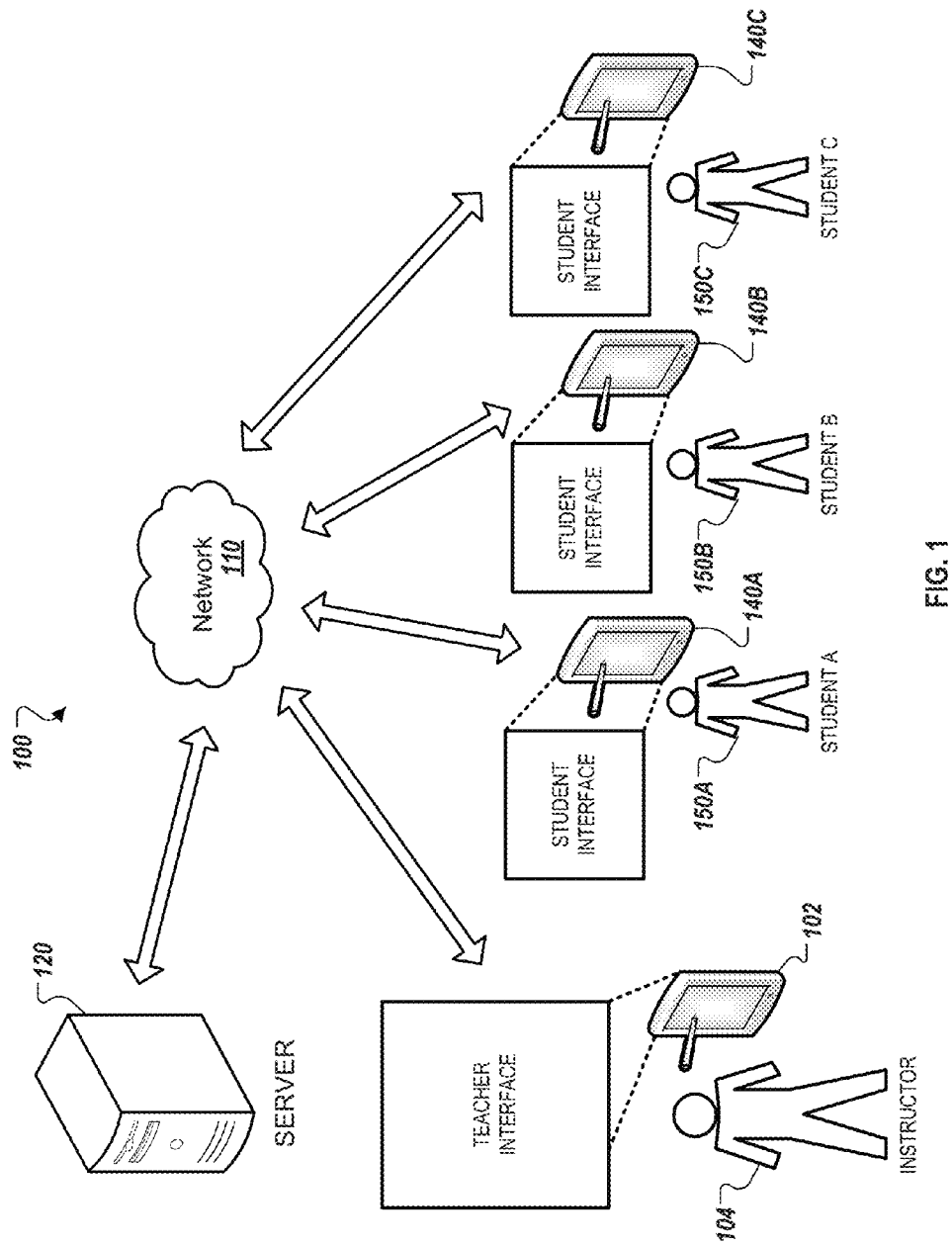
FIG. 1 is a block diagram of an example of a system architecture for using computing devices in a learning environment.

FIG. 1 is a block diagram of an example of a system architecture for using computing devices in a learning environment. Student devices 140A-C may be used by students 150A-C in a learning environment. Briefly, the system 100 includes an instructor device 102 that may be used by an instructor 104 to teach the students 150A-C, student devices 140A-C that may be used by the students 150A-C to learn, and a server 120 that may facilitate communications between the student devices 140A-C and the instructor device 102 over a network 110.

The instructor device 102 may be a computing device used by the instructor 104. A computing device may be a tablet computer, a smartphone, a laptop computer, a desktop computer, or other appropriate computing device. The instructor device 102 may be used by the instructor 104 to notify students 150A-C to view particular educational content on the student devices 140A-C and may be used by the instructor 104 to view information indicating if the students 150A-C are viewing the particular educational content.

The student devices 140A-C may be computing devices that are used by the students 150A-C. The student devices 140A-C may be used by the students 150A-C to learn. For example, the student devices 140A-C may display portions of lessons to the students 150A-C. The student devices 140A-C may receive notifications indicating the particular educational content that an instructor 104 has shared.

The server 120 may facilitate communications between the student devices 140A-C and the instructor device 102 over a network 110. For example, the server 120 may receive the indications from the instructor device 102 of particular educational contents shared by the instructor 104 to be viewed on the student devices 140A-C by the students 150A-C. The indications received by the server 120 may be the indications, described above, that may be provided by the instructor device 102.

The server 120 may provide notifications to student devices 140A-C of the particular educational contents shared by the instructor 104 to be viewed on the student devices 140A-C by the students 150A-C. The notifications provided by the server 120 may be the notifications, described above, that may be received by the student devices 140A-C.

Different configurations of the system 100 may be used where functionality of the instructor device 102, server 120, and student devices 140A-C, may be combined, further separated, distributed, or interchanged. For example, in another configuration of the system 100 the instructor device 102 may directly communicate with the student devices 140A-C without the server 120 to monitor the student devices 140A-C.

Figure 2:
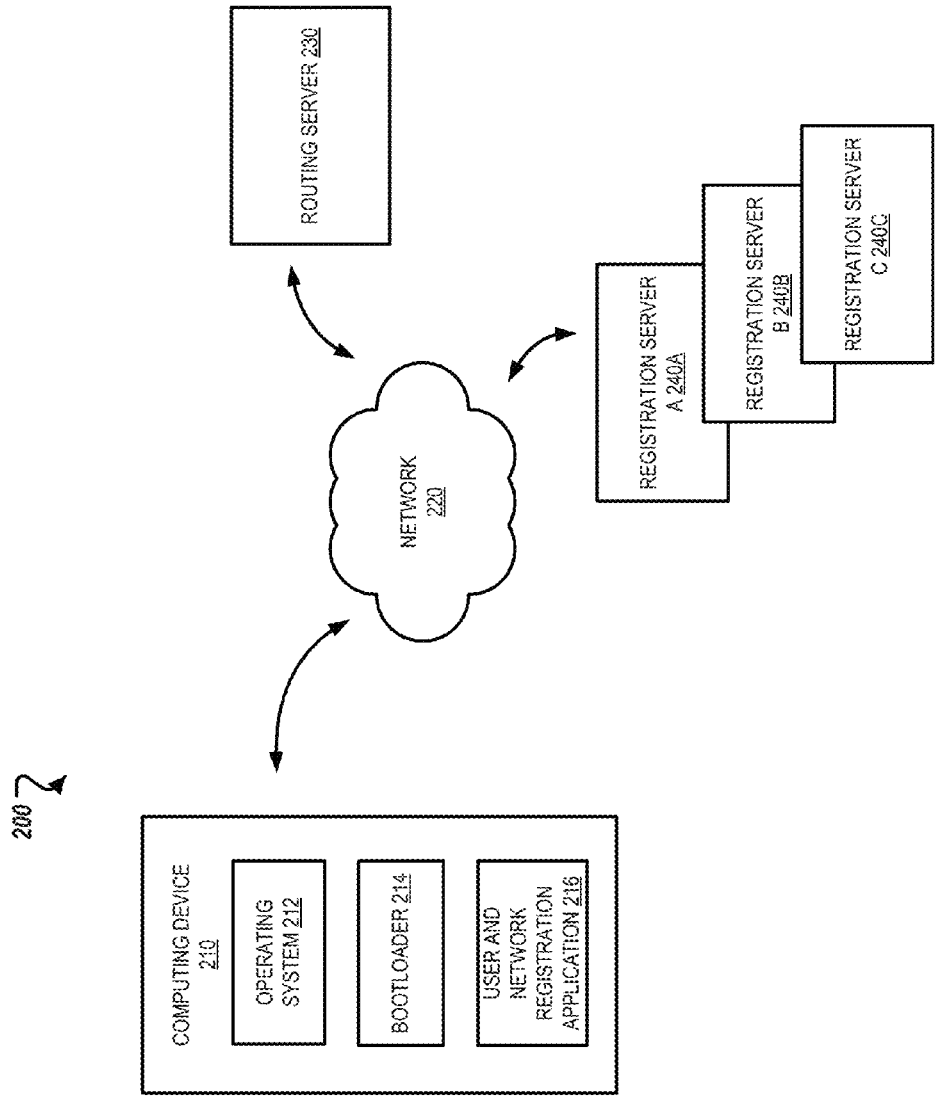
FIG. 2 is a diagram showing an example of a system for managing a computing device.
Figure 3:
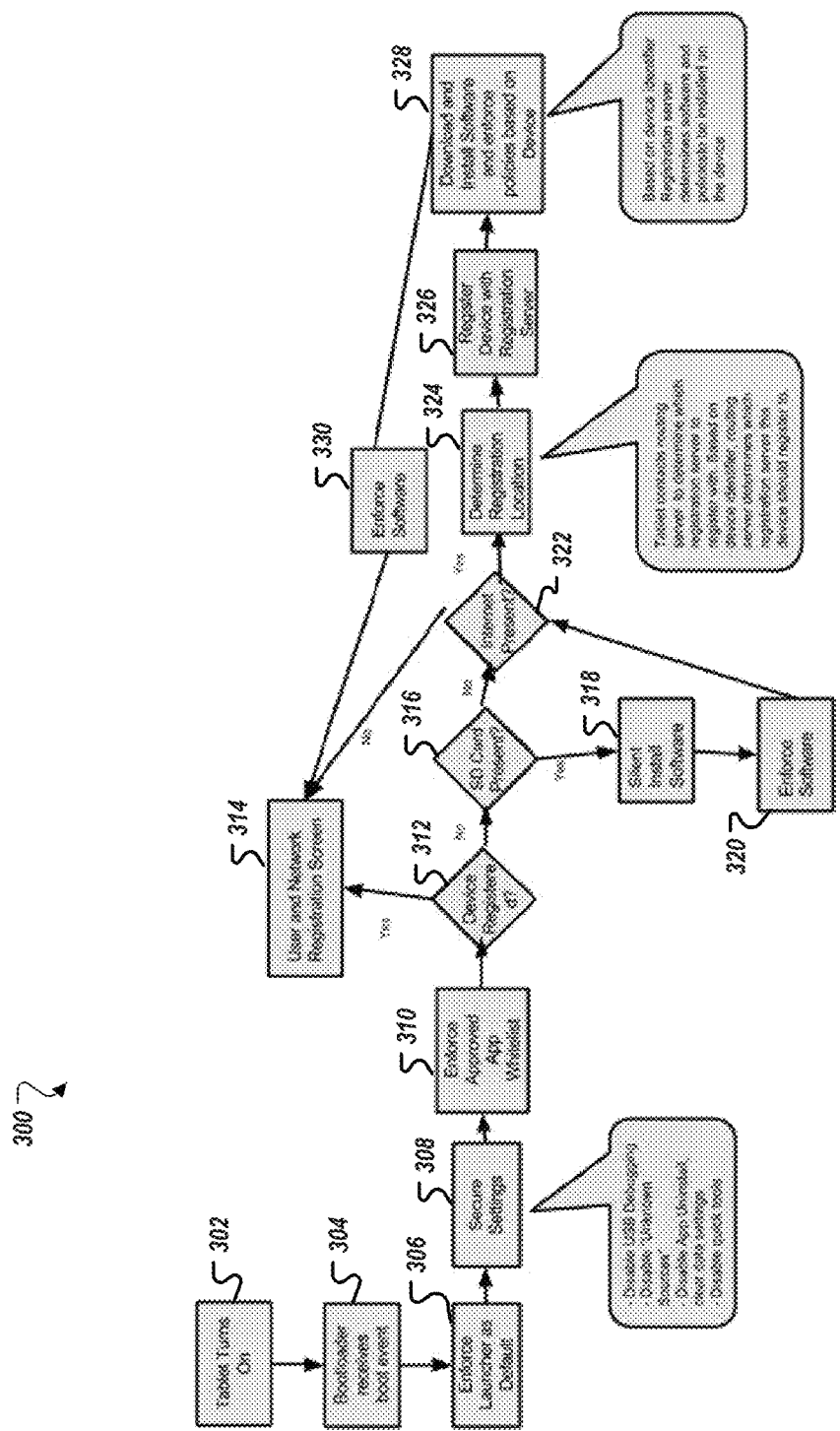
FIG. 3 is a flowchart showing an example of a process for managing a computing device.

FIG. 2 is a diagram showing an example of a system 200 for managing a computing device 210, and FIG. 3 is a flowchart 300 showing an example of a process for managing a computing device. The process of FIG. 3 may be performed by the system of FIG. 2, and the following describes the system and process together, although the process may be performed by a different system.

Generally, the system 200 may include the computing device 210, a network 220, a routing server 230, and one or more registration servers 240A-C. The computing device 210 may be a mobile computing device, for example, a tablet, a phone, or a laptop computer. The computing device 210 may include an operating system 212, a bootloader 214, and a user and network registration application 216.

The operating system 212 may be a standard operating system of the computing device 210 that manages hardware resources of the computing device 210 and provides common services for software on the computing device 210. For example, the operating system 212 may be the Android operating system or the iOS operating system. The operating system 212 may be installed in a protected system folder of the computing device 210 so that even when the computing device 210 is factory reset, the operating system 212 may still be loaded, although settings for the operating system 212 may be reset to the initial settings provided by the manufacturer of the computing device 210.

The bootloader 214 may be software that ensures that educational software is installed on the computing device 210. For example, the bootloader 214 may be small lightweight software that is run during initial use of the computing device 210 and after every factory reset of the computing device 210. The bootloader 214 may receive a boot event from the operating system 212 that indicates that the operating system 212 has finished booting (302 and 304).

In response to receiving the boot event, the bootloader 214 may enforce the user and network registration application 216 to be the default application that is next launched (306), and secure settings for the computing device 210 (308). For example, the bootloader 214 may disable universal serial bus (USB) debugging for the computing device 210, disable the installation of software from unknown sources, disable the uninstallation of applications, disable the clearing of settings, and disable quick tools that may be supported by the operating system 212. The bootloader 214 may be installed in a protected system folder of the computing device 210, which may be the same protected system folder that the operating system 212 is installed in, so that even when the computing device 210 is factory reset, the bootloader 214 may still be retained.

Next, the bootloader 214 may only enable applications listed in a whitelist to be installed (310). The bootloader 214 may then determine if the computing device 210 has already been registered (312). The computing device 210 may be considered to be registered if the educational software is installed on the computing device 210. Accordingly, when the computing device 210 has educational software installed, the computing device 210 may be considered to be registered, but when the computing device 210 is factory reset so that the educational software is removed, the computing device 210 may be considered to be unregistered. Alternatively or additionally, the computing device 210 may only be registered after the educational software is installed so that if the computing device 210 is registered the educational software must be installed.

The bootloader 214 may determine if the computing device 210 is already registered based on determining if educational software indicated in the whitelist is installed. If educational software is already installed, the bootloader 214 may determine that the computing device 210 is already registered. If educational software is not already installed, the bootloader 214 may determine that the computing device 210 is not registered. If the computing device 210 is registered, the bootloader 214 may launch the user and network registration application 216 (314).

If the computing device 210 is not registered, the bootloader 214 may check if there is memory accessible by the computing device 210 from which the educational software on the whitelist may be installed (316). For example, the bootloader 214 may determine if a Secure Digital (SD) memory card is accessible by the computing device 210 and determine if the memory card stores data from which the educational software on the whitelist may be installed. If the SD memory card does include data from which the educational software on the whitelist may be installed, the bootloader 214 may cause the educational software to be installed from the SD memory card.

The bootloader 214 may use a silent install process where the user of the computing device 210 may not realize that the educational software is being installed (318). After the educational software is successfully installed, the bootloader 214 may enforce execution of the educational software (320). For example, the bootloader 214 may modify a boot sequence of the computing device 210 so that after the operating system 212 is loaded, the educational software is loaded and the bootloader 214 is no longer loaded. Alternatively, if the educational software modifies a boot sequence to cause the educational software to be loaded after the operating system 212 is loaded, the bootloader 214 may disable itself so that the bootloader 214 is no longer executed when the computing device 210 is turned on. During a factory reset of the computing device 210, the boot sequence may be reverted to its original form so that the bootloader 214 is again executed to ensure that the educational software is installed.

After the bootloader 214 enforces execution of the educational software (320), or if the bootloader 214 determines there is no memory accessible by the computing device 210 from which the educational software on the whitelist may be installed (316), the bootloader 214 may determine if there is a network connection, e.g., an Internet connection (322). If there is no network connection, the bootloader 214 may launch the user and network registration application 216 so that the user may establish a network connection (314). If the bootloader 214 determines there is a network connection, the bootloader 214 may begin a device registration process.

For the device registration process, the bootloader 214 may first determine a registration location for the computing device 210 by communicating with a routing server 230 (324). The bootloader 214 may determine a unique identifier, e.g., a serial number, a media access control (MAC) address, etc., and an authentication key for the computing device 210. For example, the bootloader 214 may determine the unique identifier and the authentication key from data stored in the system folder that is retained even when the computing device 210 is factory reset. The bootloader 214 may provide the unique identifier and the authentication key to a routing server 230.

The routing server 230 may authenticate the computing device 210 based on the unique identifier and the authentication key. For example, the routing server 230 may determine that the serial number "FA3423" is to be registered with the system 200 and the authentication key "87907" is correct for the serial number. The routing server 230 may then determine which registration server 240A-C the computing device 210 should be registered with.

Different registration servers may handle different environments. For example, a first registration server may be a demonstration server that is used for demonstrating the system 200, a second registration server may be a development server that is used for development, a third registration server may be an active use server located in the U.S. that handles registration of computing devices used in the U.S., and a fourth registration server may be an active use server located in a different country, e.g. Europe, that handles registration of computing devices used in that country. In an example, the routing server 230 may determine that the serial number of "FA3423" is for a computing device to be used for actual use in the U.S. and route the registration to a registration server located in the U.S. that handles registration of computing devices used in the U.S.

The registration server 240 selected by the routing server 230 may then register the computing device 210 and provide educational software and policies to be enforced on the computing device 210 (326). The registration server 240 may determine the appropriate educational software and policies for the computing device 210 based on the unique identifier provided by the bootloader 214. For example, the registration server 240 may determine that the serial number of the computing device 210 corresponds to a computing device to be used for a particular school system, and determine that the particular school system has determined to use a particular version of particular educational software. In the case where the educational software is already installed on the computing device 210, e.g., from a SD card, the registration server 240 may provide updates to the software if appropriate (rather than providing the basic educational software itself) and policy settings to enforce on the computing device 210, or provide only policy settings, e.g., if there are no updates needed.

The bootloader 214 may cause any educational software or updates received from the registration server 240 to be installed and enforce the policies indicated by the registration server 240 (328). Once the bootloader 214 has ensured that the educational software is installed and the relevant policies enforced, the bootloader 214 may enforce execution of the educational software, e.g., modifying a boot sequence so that the educational software is launched after the operating system 212 boots and modifying the boot sequence so that the bootloader 214 is no longer executed when the computing device 210 is turned on, until the next factory reset of the computing device 210 (330).

The user and network registration application 216 may enable a user to register to use the system 200 and may enable the user to adjust network settings to establish a network connection. For example, if the bootloader 214 determines that no network connection is available so the computing device 210 may not be registered with the registration servers 240, the user may adjust the network settings to establish a network connection after which the bootloader 214 may then register the computing device 210 with the registration servers 240 and allow the user to register to use the system 200.

While the above has been described using educational software, in some implementations, the system 200 may ensure that particular non-educational software is installed instead of educational software.

What is claimed is:

1. A computer-implemented method comprising:
   detecting with a bootloader that an operating system of a computing device has finished booting;
   in response to detecting with the bootloader that the operating system of the computing device has finished booting, disabling installation of software on the computing device except for particular educational software;
   determining that the particular educational software is not installed on the computing device;
   in response to determining that educational software is not installed on the computing device; installing the particular educational software;
   after installing the particular educational software, modifying a boot sequence of the computing device so that the particular educational software is executed after the operating system has finished booting; and
   disabling the bootloader.

2. The method of claim 1, wherein disabling installation of software on the computing device except for particular educational software comprises:
   obtaining a whitelist of educational software that is permitted to be installed; and
   enabling the educational software on the whitelist to be installed.

3. The method of claim 1, wherein the bootloader is installed in a protected system folder of the computing device.

4. The method of claim 1, wherein disabling installation of software on the computing device except for particular educational software comprises:
   disabling universal serial bus (USB) debugging for the computing device, the installation of software from unknown sources, clearing of settings, and quick tools that may be supported by the operating system.

5. The method of claim 1, wherein installing the particular educational software comprises:

determining presence of memory that is accessible by the computing device that stores installation data for the particular educational software; and installing the particular educational software from the memory that is accessible.

6. The method of claim 1, wherein disabling the bootloader comprises:

modifying the boot sequence of the computing device so that the bootloader is not loaded.

7. A system comprising:

one or more computers; and one or more storage devices storing instructions that are operable, when executed by the one or more computers, to cause the one or more computers to perform operations comprising:

detecting with a bootloader that an operating system of a computing device has finished booting;

in response to detecting with the bootloader that the operating system of the computing device has finished booting, disabling installation of software on the computing device except for particular educational software;

determining that the particular educational software is not installed on the computing device;

in response to determining that educational software is not installed on the computing device; installing the particular educational software;

after installing the particular educational software, modifying a boot sequence of the computing device so that the particular educational software is executed after the operating system has finished booting; and disabling the bootloader.

8. The system of claim 7, wherein disabling installation of software on the computing device except for particular educational software comprises:

obtaining a whitelist of educational software that is permitted to be installed; and enabling the educational software on the whitelist to be installed.

9. The system of claim 7, wherein the bootloader is installed in a protected system folder of the computing device.

10. The system of claim 7, wherein disabling installation of software on the computing device except for particular educational software comprises:

disabling universal serial bus (USB) debugging for the computing device, the installation of software from unknown sources, clearing of settings, and quick tools that may be supported by the operating system.

11. The system of claim 7, wherein installing the particular educational software comprises:

determining presence of memory that is accessible by the computing device that stores installation data for the particular educational software; and installing the particular educational software from the memory that is accessible.

12. The system of claim 7, wherein disabling the bootloader comprises:

modifying the boot sequence of the computing device so that the bootloader is not loaded.

* * * * *